July 7, 1953  R. A. BOBO  2,644,404
GAS LIFT VALVE
Filed Dec. 21, 1951

INVENTOR.
R. A. BOBO
BY Hudson & Young
ATTORNEYS

Patented July 7, 1953

2,644,404

UNITED STATES PATENT OFFICE 2,644,404

GAS LIFT VALVE

Roy Alexander Bobo, Houston, Tex., assignor to Phillips Petroleum Company, a corporation of Delaware Application December 21, 1951, Serial No. 262,874

9 Claims. (Cl. 103—232)

This invention relates to electrically operated valves. In one aspect this invention relates to solenoid valves. In another of its aspects this invention relates to gas lift valves suitable for use in the recovery of oil from wells.

When sufficient gas and gas pressure are no longer available from the oil producing reservoir to maintain natural flow of oil from a producing well or when the flow column loads up with water, the necessary additional volume of gas to maintain flow is introduced into the tubing at the proper depth. This gas is injected at the well-head into the space between the tubing and the outer casing of the oil well. Gas lift injection and oil flow is usually accomplished with the aid of valves located at spaced intervals along the tubing, and which can be opened or closed to permit flow of gas therethrough depending on the oil level in the well and the gas input pressure. Usually the volume of extraneous gas used is kept to a minimum by control of the flow valves, some types of which are automatic, and also by control of the input gas pressure, or by a combination of both. During the gas-lift operation the oil is educted together with the introduced extraneous gas up through the tubing to the surface. It is especially desirable that the interior of the tubing be free from any obstructions since at times it is necessary to insert various devices within the tubing for cleaning the same, to determine reservoir pressure, etc.

It is an object of this invention to provide an improved gas-lift valve suitable for use in educting oil from an oil reservoir. It is another object of this invention to provide a gas-lift valve suitable for use with a tubing wherein the interior of the tubing is unobstructed. It is another object of this invention to provide a valve which is capable of opening against the considerable pressure differential which usually exists across both sides of the valve head. In at least one aspect of this invention at least one of these objects will be obtained.

The detailed construction and additional advantages and objects of this invention will appear more fully from the following description and accompanying drawing wherein a preferred embodiment of this invention is disclosed. It should be understood however that the drawings and descriptions are illustrative only and are not to be taken or construed as limiting the invention.

Figure 1:
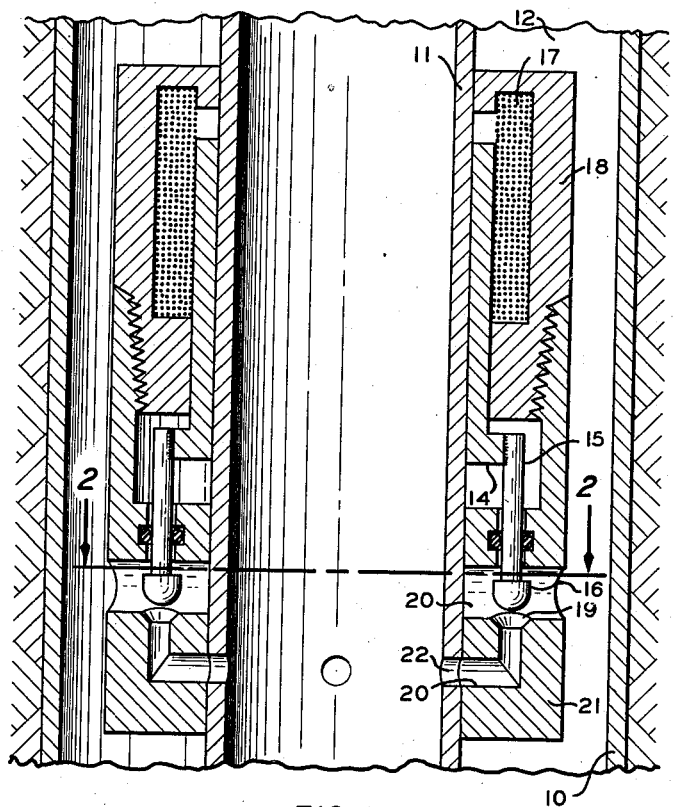
Figure 2:
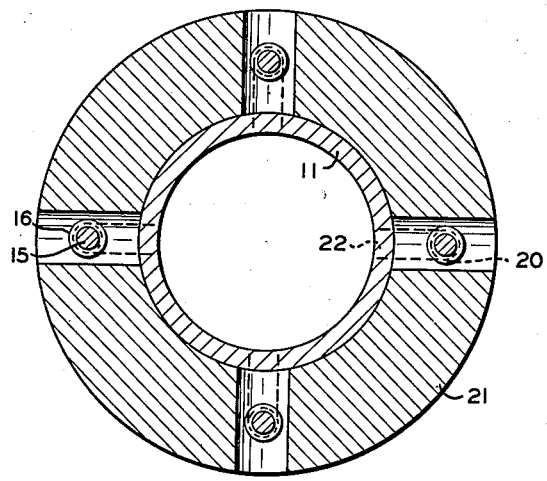
Figure 3:
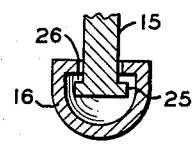

In the drawings: Fig. 1 is a longitudinal cross-sectional view of an apparatus of my invention, and Fig. 2 is a cross-sectional view of this apparatus of my invention taken along the line 2—2 of Fig. 1. Fig. 3 is a cross sectional view of a typical lost-motion connection between a valve stem and a valve head which is suitable in an apparatus of my invention.

I have now provided an apparatus which advantageously utilizes the annular space between the casing and the tubing in a gas-lift operation. In accordance with my invention, the solenoid of a solenoid operated valve suitable for use in a gas-lift operation is made concentric with and surrounding the tubing. The valve if desired may be fitted into a thickened section of the tubing. In this way almost all the space between the tubing and the casing is usable for the construction of a valve capable of exerting considerable pull or force and, even though the solenoid winding may occupy more area for a given number of turns, the plunger to which the valve head is attached or fixed can advantageously be made with a larger cross sectional area to provide a greater force. The tubing is preferably made of a suitable non-magnetic material at least that portion thereof in contact with the valve and can be attached to the regular tubing string by screw threads and collars, couplings or any other suitable type of connection. Generally, and in accordance with this invention the section of the tubing adjacent to the gas lift valve is made of a suitable non-magnetic material and is surrounded by a concentric hollow core (plunger) to which is attached at one end one or more valve stems. At the end of the valve stem is attached a suitable valve head. The valve head is positioned to close and seal off a conduit which is used to introduce the oil-educting gas from the annular space between the tubing and casing into the interior of the tubing. Surrounding a substantial portion of the plunger (armature) is a solenoid winding which is employed to move the plunger. Surrounding the solenoid is a metallic housing or magnet which is attached to the tubing and which further fixes the solenoid and plunger in position on the tubing. In operation, when the winding of the solenoid is energized, force is exerted upon the plunger to cause movement of the plunger up or down along the tubing. This movement of the plunger moves the valve back and forth on its seat and provides control of gas flow from the annular space surrounding the tubing through a conduit into the interior of the tubing.

Referring now to the drawings and to Fig. 1, the invention and operation thereof being explained in conjunction with this particular embodiment, a casing is generally indicated at 10, and the annular space between casing 10 and tubing 11 is indicated at 12. Surrounding a portion of the tubing is the plunger 14 which is made of suitable magnetic susceptible material such as iron, etc. Suspended from and attached to plunger 14 is the valve stem 15 which terminates at the other end with valve head 16. The connection between valve stem 15 and valve head 16 instead of being direct and fixed may be a lost motion type of connection so as to impart a hammer blow to the valve head so as to lift it off its seat when a high pressure differential exists across it. Surrounding a substantial portion of plunger 14 is solenoid 17 and surrounding solenoid 17 is metallic housing or magnet 18. Magnet 18 is shown screwed into adapter or collar 21 which is attached and fixed to tubing 11. In place of a collar or adapter a thickened portion of tubing 11 might be employed. Plunger 14, solenoid 17 and magnet 18 are arranged concentrically around each other and are located within the annular space between the tubing 11 and casing 10. When solenoid 17 is energized magnetic forces are developed which cause movement of plunger 14 up or down along tubing. This movement lifts or places valve head 16 on or off seat 19 which is located within conduit 20 of adapter 21. In operation when the windings of the solenoid are energized, plunger 14 together with valve stem 15 is lifted so as to move valve head 16 off valve seat 19 and gas flows from the annular space between the tubing and casing into the interior of the tubing via gas inlet 22. That portion of the tubing surrounded by plunger or armature 14 is preferably made of non-magnetic metallic material, the armature itself being made of magnetic metallic material. Magnetic housing 18 is provided to increase the force exerted by solenoid 17 upon plunger 14. Magnetic housing 18 as shown encompasses solenoid 17 completely and is shown in contact with a portion of the tubing 11. Magnetic housing 18 therefore acts as a stop for plunger 14. However any other suitable means such as the projection along tubing 11 may be used as simple stopping means for plunger 14.

Referring now to Fig. 2 which is shown for reasons of clarity and better understanding of the invention, the reference characters therein denote the same parts of the apparatus which are designated by similar characters shown in Fig. 1. Fig. 2 illustrates a partial cross-section of this particular embodiment of my invention. Four valves are shown spaced on the outside of the tubing. It is of course realized that any number of valves may be operated in combination with this invention.

Fig. 3 illustrates in cross section a typical, suitable lost motion connection between the valve stem and valve head to impart a hammer blow to the valve head so as to lift it off its seat. In operation, when valve stem 15 is moved a hammer blow is imparted to valve head 16 by the outwardly turned flange 25 of the valve stem when it hits the inwardly turned flange 26 of the valve head.

As will be obvious to those skilled in the art upon reading this disclosure many modifications, improvements and substitutions are possible without departing from the spirit or scope of this disclosure.

I claim:

1. An apparatus comprising a casing; a section of tubing therein defining an annular space between said tubing and said casing; gas inlet means arranged about said tubing comprising a plunger surrounding a portion of and slidably arranged on said tubing; a valve stem suspended at one end from said plunger and terminating at the other end with a valve head, said valve head being adapted and positioned to close off a conduit connecting the interior of said tubing and said annular space and a solenoid surrounding a substantial portion of said plunger and permitting movement of said plunger between said tubing and said solenoid along said tubing.

2. In a gas lift system in combination, a well including a tubing within a casing, at least one valve comprising a plunger surrounding a portion of said tubing and adapted to move up and down thereon, gas flow controlling means attached to said plunger and positioned and adapted to control the flow of gas into said tubing and a solenoid surrounding said plunger and adapted to move said plunger when the solenoid is energized.

3. A gas lift valve comprising a tubing, gas flow controlling means surrounding a portion of said tubing, slidably mounted thereon and positioned and adapted to control the flow of gas to said tubing, a solenoid surrounding a substantial portion of said controlling means and for moving same and a magnet surrounding said solenoid.

4. An apparatus comprising a casing; tubing therein defining an annular space between said tubing and said casing, an armature surrounding a portion of said tubing and slidably mounted thereon, a solenoid surrounding a substantial portion of said armature and a magnet surrounding said solenoid, said armature, said solenoid and said magnet being concentrically arranged with respect to each other and located within said annular space.

5. An apparatus comprising a casing, a tubing therein defining an annular space between said tubing and said casing; a conduit connecting said annular space with the interior of said tubing; an armature surrounding a portion of said tubing and positioned and adapted to open or close said conduit and a solenoid slidably mounted on and surrounding a substantial portion of said armature, said armature and solenoid being located within said annular space.

6. An apparatus comprising a casing; tubing therein defining an annular space between said tubing and said casing; gas inlet means on said tubing comprising a hollow core surrounding a portion of and slidably arranged on said tubing, a valve stem suspended at one end from said core and terminating at the other end with a valve head, said valve head being adapted and positioned to close off a conduit connecting the interior of said tubing and said annular space, a solenoid surrounding a substantial portion of said core and a magnet surrounding said solenoid and fixedly attached to said tubing, said core, said solenoid and said magnet being located concentrically within said annular space.

7. An apparatus comprising a tubing; a hollow concentric plunger surrounding a portion of said tubing and slidably mounted thereon; a conduit extending through said tubing; a valve stem attached at one end to said plunger and terminating at the other end with a valve head, said other end having a lost motion connection between said valve stem and said valve head, said valve head being positioned and adapted to close off said conduit; a solenoid concentrically surrounding said plunger and positioned to permit slidable movement of said plunger therealong when said solenoid is energized.

8. An apparatus according to claim 7 wherein a magnet concentrically surrounds said plunger one end of said magnet being in contact with the outside of said tubing and the other end of said magnet being in contact with the outside of said plunger and positioned to permit movement of said plunger when the solenoid is energized.

9. A gas lift valve comprising a tubing; a conduit extending through said tubing; a concentric armature surrounding a portion of said tubing and slidably positioned along said tubing; conduit closing means attached to said armature and adapted to close off said conduit; and a solenoid surrounding said armature.

ROY ALEXANDER BOBO.

References Cited in the file of this patent

UNITED STATES PATENTS

| Number | Name | Date |
| --- | --- | --- |
| 1,790,547 | La Pointe | Jan. 27, 1931 |
| 1,888,615 | Berdon | Nov. 22, 1932 |
| 2,278,532 | Crickmer | Apr. 7, 1942 |
| 2,343,806 | Scofield | Mar. 7, 1944 |